United States Patent Office 2,909,501
Patented Oct. 20, 1959

2,909,501

POLYMERIZABLE FIRE RESISTANT POLYESTER COMPOSITION COMPRISING HEXAHALOCYCLOPENTADIENE AND ANTIMONY TRIOXIDE

Paul Robitschek and James L. Olmstead, Niagara Falls, N.Y., assignors to Hooker Chemical Corporation, Niagara Falls, N.Y., a corporation of New York No Drawing. Application August 16, 1954
Serial No. 450,217

4 Claims. (Cl. 260—40)

This invention relates to new compositions of matter comprising polymerizable unsaturated halogen-containing polyester resins containing certain chemical additives effective in improving the fire resistance of the polymerized resin.

More particularly, this invention relates to fire resistant polyester resins containing halogen and antimony trioxide. Our invention is based upon the discovery that small additions of antimony trioxide to the halogen-containing resins of this invention result in a polyester resin having improved fire resistance, without loss of other desirable properties when in the polymerized state. The addition of small amounts of antimony trioxide to the polyester resins described herein produce a synergistic effect insofar as retarding flame spread in the polymerized resin is concerned. The polymerized unsaturated polyester resins embraced within the scope of this invention are insoluble, infusible compositions which are prepared by reacting a polybasic acid with a polyhydric alcohol to form a linear polyester having copolymerizable unsaturation, then cross-linking or copolymerizing the linear polyester so formed with olefinic type monomers.

The polyester resins which may be made more fire safe in accordance with this invention are those described and claimed in co-pending application Ser. No. 308,921, filed September 10, 1952, in which one of the present applicants is co-inventor with still another applicant. The subject matter of this application was divided, one application retaining the same serial number and resulting in Patent No. 2,779,701 and another application being assigned Serial No. 561,698 and resulting in Patent No. 2,779,700. Polyester resins described therein and embraced within the scope of this invention which contain halogen chemically combined in a polyester resin per se, may be prepared by employing a halogen-containing polycarboxylic acid and/or a halogen-containing polyhydric alcohol in the esterification reaction and/or a halogen-containing monomeric olefin in the cross-linking or co-polymerization reaction. More particularly, the polyester resins embraced within the scope of this invention which may be made more fire safe are those made by combining hexahalocyclopentadiene, especially hexachlorocyclopentadiene into the polyester molecule. For example, the invention is most suitably employed on such polyester resins when the halogen is chlorine; however, bromine and/or fluorine containing chloro-bromo, fluoro-bromo, or other mixed halogenated polyesters may be employed. A preferred class of chlorine-containing polyester resins is formed by reacting about equimolar amounts of hexachlorocyclopentadiene with maleic anhydride to form 1,4,5,6,7,7-hexachlorobicyclo-(2.2.1)-5-heptene-2,3-dicarboxylic anhydride, then esterifying this material with ethylene glycol and/or diethylene glycol in the presence of some maleic anhydride and/or fumaric acid. The product so formed is then mixed with an olefin such as styrene to form a polymerizable mixture which may be copolymerized or cured by heat, light, etc. in the presence of the usual peroxide catalyst known in this art, to form the final insoluble, infusible cured polyester resin.

The production of infusible, insoluble polyester resins which are flame retardant and have a reasonable balance of other properties is of considerable commercial importance. For instance, of castings, moldings, foamed articles or laminated structures bonded by polyester type resins are for many uses required, or at least desired, to be resistant to fire and are also required to possess sufficient mechanical, electrical and/or chemical strength. Typical illustrations of applications having such requirements is had in castings for live electrical contacts which must not be ignited by sparks or be deteriorated by heat generated therein. Structural members, such as pipes, wall coverings, panels, ash trays, etc., are further illustrations where fire resistance is desirable.

The synergistic improvements realized by incorporating small amounts of antimony trioxide into the polyester resins of this invention as compared to those of the prior art, may be more fully appreciated by a consideration of the following examples which are given to illustrate the specific features of this invention, but which are not to be construed as limiting. Where percentages of ingredients are given, they are to be taken as weight percentages, except where indicated. The fire resistant compositions of this invention were made by simply mixing chosen amounts of antimony trioxide into the liquid polyester resin to be made fire safe in the weight percentages indicated, then affecting the polymerization of the mixture in the presence of a catalyst, such as one consisting of about 2% by weight of a mixture containing 50% by weight of benzoyl peroxide in tricresyl phosphate, by heating the mixture to a temperature of about 80 degrees centigrade for about 15 minutes, then post curing the resin at 100 degrees centigrade in an oven over night. The common properties of the resins were determined by the generally accepted procedures known in art. Fire resistance is reported as burning rate in inches per minute determined by ASTM Designation D-757-49 or by ASTM Designation E84-50T.

EXAMPLE 1

An unpolymerized liquid unsaturated polyester resin was prepared by esterifying about 53 parts of ethylene glycol and 90 parts of diethylene glycol with about 395 parts of 1,4,5,6,7,7-hexachlorobicyclo-(2.2.1)-5-heptene-2,3-dicarboxylic anhydride (which was prepared by the Diels-Alder reaction of hexachlorocyclopentadiene with maleic anhydride) and about 71 parts of maleic anhydride. About 30 parts of styrene and about 100 parts of product produced by the esterification reaction were mixed together until complete solution was obtained to give a clear, substantially colorless solution of liquid polyester resin having a viscosity of about 30 poises at 25 degree centigrade on a Gardner bubble viscometer and having a chlorine content of about 30 percent by weight of the total.

Table 1 below, indicates the results of flame retardance tests per ASTM D-757-49 on cylindrical castings (8 mm.

in diameter) made from a resin prepared in a manner after Example 1. The castings had the specific compositions given in the Examples listed in Table 1. The castings were prepared by passing the liquid resin mix containing the antimony trioxide and other fillers into 8 millimeter diameter glass tubes and then the material was polymerized at 80 degrees centigrade for a period of 15 minutes. The resin was post cured at 100 degrees centigrade in an oven over night. After cooling, test specimens were prepared for flame testing. In addition, similar castings were made from the non-halogen-containing resin designated in the footnote of the table.

other fillers on the requisite number of plies of glass mat. They were cured between steel plates at a pressure of 25 p.s.i. and at a temperature of 75 degrees centigrade for 15 minutes, after which the temperature was increased to 125 degrees centigrade for 15 minutes. After post curing the laminates at 100 degrees centigrade for 24 hours, test specimens were prepared for flame testing. In addition, similar laminates were made from blends of the resin of Example 1 with the other resins as designated in the footnote of the table. Also, similar laminates were made using "Selectron" 5003.

The results given in Table II show that a sample of

Table 1

FLAME RETARDANCE OF CASTINGS (PER ASTM D 757-49)

| Casting | Composition | Percent | Time to ignite (sec.) | Time to flame out (sec.) | Inches burned Per minute | Remarks |
|---|---|---|---|---|---|---|
| Ex. 2 | Resin of Ex. 1 | 100 | 3 | 175 | 0.16 | Medium flame. |
| Ex. 3 | Resin of Ex. 1 plus antimony trioxide. | 98 / 2 | | | | No flame. |
| Ex. 4 | do | 96 / 4 | | | | Do. |
| Ex. 5 | do | 90 / 10 | | | | Do. |
| Ex. 6 | "Selectron" 5003 [1] | 100 | Nil | | | Continued to burn freely with a large flame not capable of rating by this test. |
| Ex. 7 | "Selectron" 5003 plus antimony trioxide. | 90 / 10 | Nil | | | Do. |

[1] Non-halogen containing polyester resin manufactured by Pittsburgh Plate Glass Co., Pittsburgh, Pa.

The results shown in Table I indicate that a small addition of antimony trioxide to hexahalocyclopentadiene derived polyester resins improves fire resistance to an unusual and surprising degree. The incorporation of as much as 10 parts of antimony trioxide in "Selectron" 5003 polyester resin does not impart flame retardant properties to that resin.

the resin of Example 1 when compounded with 3.5 percent antimony trioxide is virtually fireproof when tested in accordance with ASTM D757-49; whereas the addition of 5 percent antimony trioxide to non-chlorine containing resins appears to have no noticeable effect. Resins containing 23.5% and 17.1% chlorine respectively, which were obtained by blending the resin of Example 1

Table II

FLAME RETARDANCE OF LAMINATES (PER ASTM D 757-49)

| Laminates | Chlorine in resin (percent) | Resin blends | Percent | $Sb_2O_3$ (percent) | Time to ignite (secs.) | Time to flame out (secs.) | Inches burned per min. | Remarks |
|---|---|---|---|---|---|---|---|---|
| Ex. 8 | 30 | Resin of Ex. 1 | 100 | 3.5 | | | | No flame. |
| Ex. 9 | 26.5 | do. [1] | 100 | 3.5 | | | 0.08 | No flame but a few intermittent flashes between 20 and 35 sec. |
| Ex. 10 | 23.5 | Resin of Ex. 1 plus [2] | 100 | 5 | 6 | 47 | 0.10 | Low flickering flame. |
| Ex. 11 | 18 | do. [3] | 100 | 5 | 3 | 67 | 0.11 | Medium flame. |
| Ex. 12 | 0 | "Selectron" 5003 | 100 | 5 | Nil | | | Continued to burn freely with large flame not capable of rating by this test. |

[1] Resin of Example 1 modified by additional styrene to make 26.5% Cl containing resin.
[2] Semi-flexible laboratory resin derived from hexachlorocyclopentadiene containing 35% styrene, and containing adipic acid.
[3] Flexible polyester resin manufactured by Rohm and Haas Co., Philadelphia, Pennsylvania.

Table II below, indicates the results of flame retardance tests per ASTM D-757-49 on ⅛" glass fiber laminates (Owens Corning Fiberglas #16 mat) made from a resin prepared in a manner after Example 1. The laminates had the specific compositions given in the examples listed in Table II. The laminates were prepared by spreading the liquid resin mix containing the antimony trioxide and with other resins, are less flame retardant than the original material. The examples in Table II show that if the chlorine content chemically bound in the polyester resin is of a high order such as over 25 to 28% and preferably in the region of 30%, such as is obtained by the incorporation of hexachlorocyclopentadiene adducts the action of antimony oxide in imparting fire resistance is extremely powerful. In other words, the synergistic effect already discussed is greatly magnified.

Examples of test specimens of flat and corrugated panels as tested by the "Tunnel" Method (ASTM E84-50T) are reported in the following Table III.

Table III
FLAME SPREAD TESTS ON LAMINATED POLYESTER-GLASS FIBER PANELS
TEST MADE BY "TUNNEL" METHOD (ASTM E 84-50T)

| Example No | 13 | 14 | 15 | 16 | 17 | 18 | 19 |
|---|---|---|---|---|---|---|---|
| Resin | Non-chlorine containing | Of Example 1 | Of Example 1 | Non-chlorine containing | Non-chloring containing | Of Example 1 | Of Example 1. |
| Panel type | Corrugated | Corrugated | Corrugated | Flat | Flat | Flat | Flat. |
| Filler | None | None | 1% $Sb_2O_3$ | None | 15% $Ca_2CO_3$, 5% $Sb_2O_3$ | None | 15% $Ca_2CO_3$, 5% $Sb_2O_3$. |
| Thickness of panel, inches | 0.063 | 0.063 | 0.063 | 0.100 | 0.100 | 0.100 | 0.100. |
| Time to ignite, secs | 20 | 30 | 35 | | | | |
| Flame spread rating | 445 | 69.2 | 45 | 398 | 197 | 100 | 35.9. |
| Smoke rating | N.D [1] | 370 | 560 | N.D | N.D | 1,170 | 600. |
| Fuel contribution, Percent | N.D | 10 | 0 | N.D | N.D | 10 | 5. |
| Duration of test, mins | 3.42 | 10.00 | 10.00 | 2.67 [2] | 4.00 [2] | 10.00 | 10.00. |

[1] Not determined—reported to be very high—actually flame spread beyond point where smoke readings made.
[2] Test discontinued (due to excessive burning) to prevent damage to equipment.

NOTE.—Flame spread, and fuel contribution, are rated 100 by this test for Grade A red oak, and zero for asbestos cement board.

From the data in Table III it is apparent that as little as 1% of antimony trioxide, as well as the addition of 5% antimony trioxide, improves the flame spread rating to a value below 50 thereby enabling these resinous compositions to be classified in accordance with recognized building codes as "Fire Resistant."

A comparison of the resins of this invention containing antimony trioxide with both non-chlorine and chlorine containing polyester resins of the prior art made from phthalic and tetrachlorophthalic anhydride show that the resins of this invention possess outstanding fire resistance properties due to the antimony trioxide addition while still maintaining an exceptional balance of other physical properties. For example, glass fiber laminates containing about 33% by weight glass fiber the remaining being a resin blend of this invention, after that depicted in Example 1, but containing about 75% by weight of such resin, 20% by weight of calcium carbonate, and 5% by weight of antimony trioxide was molded in a commercial positive compression mold: samples of the laminate, which of course were fire resistant, had a tensile strength of 21,700 p.s.i.; a flexural modulus at room temperature of 1,880,000 p.s.i. and at 180 degrees Fahrenheit of 900,000 p.s.i.; a flexural modulus after immersion in boiling water for two hours of 1,660,000 p.s.i. when measured at room temperature; a flexural strength at room temperature of 38,600 p.s.i.; and at 180 degrees Fahrenheit of 25,000 p.s.i.; and a flexural strength after immersion in boiling water for two hours of 34,000 p.s.i.

The particular proportion of antimony trioxide to be employed in making the composition of this invention depends upon the halogen content of the polyester resin to be made more flame resistant in addition to the degree of flame proofness desired. We have found that at least 0.5% by weight of the total compositon of antimony trioxide should be incorporated in the halogen-containing polyester resin. In cases where the halogen content of the polyester resin is low on the order of 5 to 15 percent by weight of the total composition, then about 10 to 20 percent by weight of antimony trioxide may be advantageously employed for the purpose of this invention. Although larger amounts of antimony trioxide may be employed if desired, we have found that this is uneconomical. A preferred embodiment of this invention comprises employing between about 0.5 and 5 percent by weight of antimony trioxide when the halogen-containing polyester resin contains between about 15 and 40 percent by weight of chlorine.

Although we have described our invention with particular emphasis on using the adduct of hexachlorocyclopentadiene with maleic anhydride as the hexahalocyclopentadiene component of the polyester resin, this has been done so that comparisons may be made and to facilitate the understanding of the subject matter of this invention. It is to be understood that various other adducts of hexahalocyclopentadiene may be suitably employed for the purpose of this invention and that the maleic anhydride adduct used to exemplify this invention may be substituted by any one or mixture of the following: 1,4,5,6,7,7-hexachloro - 2 - methylbicyclo-(2,2,1)-5-heptene-2,3-dicarboxylic anhydride, said compound and its method of preparation being disclosed and claimed in co-pending application Ser. No. 308,924, filed September 10, 1952, now United States Patent 2,779,769, issued January 29, 1957, involving the reaction of hexachlorocyclopentadiene with citraconic anhydride; the mono-methyl ester of 1,4,5,6,7,7 - hexachlorobicyclo-(2.2.1)-5-heptene - 2,3-dicarboxylic acid, said compound being prepared by the method involving the reaction of hexachlorocyclopentadiene with maleic anhydride followed by esterification of the adduct so produced with the amount of methanol required to produce the mono-methyl ester; 3-(1,4,5,6,7,7-hexachlorobicyclo-(2.2.1) - 5 - heptene-2-yl)-methoxy-1,2-propanediol, said compound and its method of preparation being described in co-pending application Ser. No. 308,922, filed September 10, 1952, involving the reaction of hexachlorocyclopentadiene with alpha allyl glycerol ether; 1,4,5,7-tetrachloro - 6,7 - difluorobicyclo-(2.2.1)-5-heptene-2,3-dicarboxylic acid, said compound and its method of preparation being disclosed and claimed in copending application Ser. No. 308,934, filed of September 10, 1952, now abandoned, involving the reaction of 1,2,4,5-tetrachloro-1,3-difluorocyclopentadiene with maleic anhydride; 1,4,5,6,7,7 - hexachlorobicyclo - (2.2.1)-5-heptene-2-acetic-2-carboxylic anhydride, said compound and its method of preparation being disclosed and claimed in co-pending application Ser. No. 308,923, filed of September 10, 1952, now United States Patent 2,752,361, issued June 26, 1956, involving the reaction of hexachlorocyclopentadiene with itaconic anhydride; and 1,4,5,6,7,7-hexachlorbicyclo - (2.2.1) - 5 - heptene-2,3-dicarbonyl chloride; said compound and its method of preparation being disclosed and claimed in co-pending application Ser. No. 450,216, filed August 16, 1954, now United States Patent 2,812,347, issued November 5, 1957, involving the reaction of hexachlorocyclopentadiene with fumaryl chloride.

Various other adducts of hexahalocyclopentadiene may also be employed, such as: diallyl-1,4,5,6,7,7-hexachlorobicyclo-(2.2.1)-5-heptene - 2,3 - dicarboxylate; diallyl-1,4,5,6,7,7 - hexachloro - 2 - methylbicyclo - (2.2.1)-5-heptene - 2,3 - dicarboxylate; diallyl 1,2,4,5,6,7,7-heptachlorobicyclo - (2.2.1)-5-heptene-2,3-dicarboxylate; and triallyl-1,4,5,6,7,7 - hexachlorobicyclo-(2.2.1)-5-heptene-2-acetate-2,3-dicarboxylate. These compounds can be prepared by reacting hexachlorocyclopentadiene with the indicated dicarboxylic acid and esterifying the resultant product with an unsaturated alcohol such as allyl alcohol.

Still other adducts of hexahalocyclopentadiene may be employed, for instance, the adducts formed with unsaturated polycarboxylic acids such as, maleic, fumaric, citraconic, itaconic, acetylene dicarboxylic and esters and halogen substituted derivatives thereof, etc.; unsaturated polyhydric alcohols such as, butene-diol, pentene-diol, etc., also unsaturated hydroxy ethers such as, allyl or vinyl glycerol ethers, allyl or vinyl pentaerythritol ethers, etc.; and, still other chemical compounds comprising an ethylenic or an acetylenic linkage which are not rendered unreactive in the polyester chain by their chemical combination into the polyester chain by way of other functional groups.

We claim:

1. A polymerizable mixture comprising (A) a polymerizable linear polyester of ingredients comprising (1) a polyhydric alcohol, (2) an adduct of hexahalocyclopentadiene and a polycarboxylic compound containing aliphatic carbon to carbon unsaturation, wherein the halogen is selected from the group consisting of chlorine, bromine, fluorine and mixtures thereof, and (3) a polycarboxylic compound containing aliphatic carbon to carbon unsaturation, (B) a polymerizable compound containing aliphatic carbon to carbon unsaturation, and (C) in admixture therewith, as a synergistic flame retardant component for the polymerized resin, from about 0.5% to about 20% by weight of the total composition of antimony trioxide.

2. A composition according to claim 1 wherein the halogen is chlorine.

3. A compositon according to claim 2 wherein the total chlorine content of the polymerizable mixture is between 5 and 40 percent by weight, and wherein the amount of antimony trioxide present is between about 0.5 and about 20 percent by weight of the total composition.

4. A composition according to claim 3 wherein the adduct of hexahalocyclopentadiene is 1,4,5,6,7,7-hexachlorobicyclo-(2.2.1)-5-heptene-2,3-dicarboxylic acid.

References Cited in the file of this patent

UNITED STATES PATENTS

| | | |
|---|---|---|
| 2,378,715 | Leatherman | June 19, 1945 |
| 2,606,910 | Herzfeld et al. | Aug. 12, 1952 |
| 2,680,105 | Baker | June 1, 1954 |
| 2,779,701 | Robitschek et al. | Jan. 29, 1957 |